United States Patent Office 3,044,966
Patented July 17, 1962

3,044,966
ATTRITION RESISTANT OXIDATION CATALYSTS
James L. Callahan, Bedford, Robert W. Foreman, Cleveland, and Franklin Veatch, Lyndhurst, Ohio, assignors to The Standard Oil Company, Cleveland, Ohio, a corporation of Ohio
No Drawing. Filed Nov. 9, 1959, Ser. No. 851,919
Claims priority, application Canada Aug. 5, 1959
5 Claims. (Cl. 252—437)

The present invention relates to an improved oxidation catalyst consisting essentially of oxides of the elements bismuth, molybdenum, and silicon. More particularly, this invention is concerned with a catalyst composition which is designed for use in large scale chemical processes having improved attrition resistance and a long active life.

We have discovered that a catalyst comprising the oxides of bismuth, molybdenum, and silicon is useful in the oxidation of hydrocarbons. While this catalyst invariably possesses useful catalytic properties regardless of the relative proportions of the essential constituents, there has been a problem associated with the preparation of a catalyst composition having a physical form which will stand up under operating conditions of the process. Certain compositions which were prepared did not possess the properties requisite to sustained operations over long periods of time. In particular, a serious problem arose when the catalyst was prepared in finely divided form suitable for use in the so-called "fluidized" processes. In the latter case, certain of the catalyst compositions became caked so that it was impossible to fluidize them. The surprising aspect of this problem was that all of the compositions appeared to meet the usual desiderata for catalysts even though they varied in the relative proportions of essential constituents. Yet when the compositions were subjected to the process operating conditions, some of the compositions rapidly deteriorated in physical quality and their catalytic activity was reduced while others performed entirely satisfactorily.

An experimental investigation of the fluidization problem led to the discovery that certain catalyst compositions exhibited an unusual phenomenon which manifested itself only in the presence of water and at an elevated temperature. Under the latter conditions needle-like projections developed on the surface of the catalyst. It was determined that these projections were composed of substantially pure molybdenum oxide apparently resulting from the migration of molybdenum oxide molecules to the catalyst surface. The phenomenon seems to have been caused by some interaction between the oxides of silicon and molybdenum as it did not occur with other metal oxides such as alumina. The presence of these needle-like crystals of molybdenum oxide (hereinafter referred to as whiskers) upon the surface of the catalyst was verified by conventional analytical and micro-photographic techniques. In some cases the whiskers tend to interlock causing caking of the catalyst particles. This is a particularly serious problem in those instances where a catalyst capable of forming whiskers is employed in a fluidized bed process as it is almost impossible to maintain the catalyst bed in a fluidized state because of the caking of the catalyst particles. Even when a whiskering catalyst does not exhibit a caking tendency, it is unsuitable since the whiskers are readily abraded from the catalyst surface with a consequent loss of molybdenum oxide. The latter effect results in a lowering of the activity and selectivity of the catalyst.

As pointed out heretofore, the problem did not manifest itself except when the catalyst was employed in an oxidation process where both the elevated temperature and the water necessary to the whisker formation were present. The puzzling aspect of this problem was that all of the catalyst compositions contained the same ingredients, albeit they were present in different proportions. A study of different catalyst formulations led to the discovery that whisker formation did not occur if the ratio of bismuth to molybdenum was carefully controlled. This study showed that catalysts having a bismuth to molybdenum atomic ratio of above 2:3 did not exhibit any whisker formation and, consequently, such catalysts had good attrition resistance and long active life.

Broadly stated, our invention is an oxidation catalyst composition comprising the elements bismuth, molybdenum, silicon, and oxygen in which the bismuth to molybdenum ratio is carefully controlled so that it is at all times above 2:3. Higher proportions of bismuth in the catalyst result in useful catalysts but, because of the relatively high cost of bismuth in comparison to the other ingredients and because additional amounts of bismuth do not improve appreciably the physical or chemical properties of the catalyst, there is generally no point in exceeding the preferred atomic ratio of about 3:4.

The catalyst may also comprise phosphorus which will affect to some extent the catalytic properties of the compositions but the presence or absence of phosphorus has no appreciable effect on the physical properties of the catalyst. If phosphorus is included in the catalyst, the final composition should contain at least 0.1% by weight of phosphorus. Hence, the catalysts of this invention may be preferred to as either bismuth silico-molybdate or bismuth silico-phosphomolybdate in the case where phosphorus is present, but the use of these terms is not to be construed to mean that the catalysts exist as pure chemical compounds. The available evidence indicates that the contrary is true and that the catalyst probably is a heterogenous micro-mixture of loose chemical combinations of the various ingredients and it is these combinations which appear to impart the desirable catalytic properties to the compositons of this invention. Accordingly, the compositions of this invention which are hereinafter referred to as bismuth silico-molybdate or bismuth silico-phosphomolybdate may have the following composition ranges so long as the atomic ratio of bismuth to molybdenum is above 2.3.

| Elements: | Weight percent |
|---|---|
| Bismuth | 4.5–55 |
| Molybdenum | 2.5–32 |
| Silicon | 0.6–42 |
| Oxygen | 20–50 |
| Phosphorus | 0–5 |

This same composition may be expressed in the following empirical chemical formula:

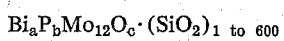

where $a$ is 8+ to 12, $b$ is 0 to 2, and $c$ is $$\tfrac{1}{2}n \cdot a + \tfrac{1}{2}m \cdot b + \tfrac{1}{2}p \cdot 12$$

where $n$, $m$, and $p$ are the average valences of bismuth, phosphorus, and molybdenum respectively in their average oxidation states which may be 2 to 3 for bismuth, 5 for phosphorus, and 4 to 6 for molybdenum which makes $c$ vary from 32 to 59. When the atomic ratio of bismuth to molybdenum is about 3:4, as mentioned earlier, the empirical formula is

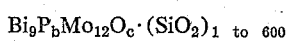

where $b$ and $c$ are as defined heretofore. When the silica is present as about 30 to 70 weight percent of the final composition, the empirical formula is

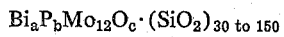

where $a$, $b$ and $c$ are defined in accordance with the definitions given above.

We shall now proceed to a description of an example of the preferred embodiment of our invention and one other example of a composition made in accord with our invention.

*Example A*

The preferred embodiment of our invention is a bismuth silico-phosphomolybdate and it may be prepared by the following procedure.

0.74 gm. of an 85% phosphoric acid were added to 83.3 gms. of a silica sol containing 30% silica. Next, 28 gms. of bismuth nitrate were dissolved in a solution made by diluting 1.6 mls. of nitric acid (70%) to 15.4 mls. with distilled water. The last-named solution was then added to the previously prepared silica sol. Next, 13.6 gms. of ammonium molybdate were dissolved in 15.4 mls. of distilled water and this solution was added to the silica sol. The catalyst slurry was then dried in an oven at 200° F. for 24 hours and then calcined in a furnace at 800° F. for 24 hours. After cooling, the catalyst was ground into particles and screened through a 60-mesh screen. The final composition has the empirical formula, by calculation, of $$(Bi_9PMo_{12}O_{52}) \cdot (SiO_2)_{65}$$

having the following composition by weight percent:

| | |
|---|---|
| Bismuth | 24.2 |
| Phosphorus | 0.4 |
| Molybdenum | 14.8 |
| Silicon | 23.4 |
| Oxygen | 37.2 |

*Example B*

The bismuth silico-molybdate catalyst was prepared following the procedure given for Example A except that no phosphoric acid was added to the catalyst slurry.

The catalysts of Examples A and B were employed as catalysts in a hydrocarbon oxidation reaction. After an extended run under the reaction conditions the catalysts showed no evidence of any whisker formation and attrition losses were minimal. Furthermore, the activity of the catalysts did not decline appreciably during the run.

A number of other catalysts were prepared in a similar manner and in all cases where the atomic ratio of bismuth to molybdenum was 2:3 or below, the catalyst exhibited whisker formation and was unsuitable for use. In those cases where the bismuth to molybdenum atomic ratio was above 2:3, the catalyst did not whisker and it was entirely satisfactory in all other respects.

There is nothing critical about the source of the ingredients of the catalyst compositions of this invention and any convenient source may be employed. One convenient source of the silicon is a silica sol which is an aqueous colloidal dispersion containing about 30% by weight of silica. As disclosed above, phosphoric acid, ammonium molybdate, and bismuth nitrate serve as convenient sources of the phosphorus, molybdenum, and bismuth, respectively.

The method of preparation of the compositions of this invention is likewise not critical as will be apparent to a person skilled in the art. The ultimate form in which the catalyst is used may determine to some extent the method of manufacture, but all such methods are within the scope of this invention. For example, if one desires to employ the catalyst in lump or pellet form a slurry of the ingredients may be extruded and dried without resorting to grinding and screening.

Another method which may be employed to prepare the catalyst involves the preparation of a slurry of the ingredients and forming the catalyst therefrom in an oil bath by dropping small amounts of the slurry through an oil bath as is well known to those skilled in the art. If on the other hand it is desired to employ the catalyst in a so-called "fluidized" process, it may be desirable to prepare the catalyst by spray drying. In the latter method a slurry of the catalyst ingredients is mechanically dispersed at the top of an enclosed vessel where it falls by the force of gravity against an ascending stream of hot gas. The dried catalyst particles are removed from the bottom of the spray drying vessel. Various procedures involving heat-treatment of the catalyst may likewise be resorted to within the scope of this invention as is well understood by those skilled in the art of catalyst manufacture.

In view of the foregoing discussion it will be apparent to those skilled in the art that many modifications in the manner of the preparation of this catalyst or in the raw materials employed to obtain the final product may be made without departing from the spirit or scope of this invention. Accordingly, this application for Letters Patent is intended to cover all such modifications of the compositions of this invention as would reasonably fall within the scope of the appended claims.

This application is a continuation-in-part of Serial No. 757,107, filed August 25, 1958, and now abandoned.

We claim:

1. A catalyst composition consisting essentially of oxides of bismuth and molybdenum as the essential catalytic ingredients and also including silica, the catalyst having a composition corresponding to the empirical chemical formula:

$$Bi_aP_bMo_{12}O_c \cdot (SiO_2)_{1 to 600}$$

wherein $a$ is a number within the range from more than 8 to 12, $b$ is a number within the range from 0 to 2, and $c$ is $\frac{1}{2}n \cdot a + \frac{1}{2}m \cdot b + \frac{1}{2}p \cdot 12$ wherein $n$, $m$, and $p$ are the average valences of bismuth, phosphorus and molybdenum, respectively, in their average oxidation states, the Bi:Mo atomic ratio being above 2:3.

2. A catalyst composition consisting essentially of oxides of bismuth and molybdenum as the essential catalytic ingredients and also including silica, the catalyst having a composition corresponding to the empirical chemical formula:

$$Bi_9P_bMo_{12}O_c \cdot (SiO_2)_{1 to 600}$$

wherein $b$ is a number within the range from 0 to 2, and $c$ is $\frac{1}{2}n \cdot 9 + \frac{1}{2}m \cdot b + \frac{1}{2}p \cdot 12$ where $n$, $m$, and $p$ are the average valences of bismuth, phosphorus, and molybdenum, respectively, in their average oxidation states, the Bi:Mo atomic ratio being 3:4.

3. A catalyst composition consisting essentially of oxides of bismuth and molybdenum as the essential catalytic ingredients and also including silica, the catalyst having a composition corresponding to the empirical chemical formula:

$$(Bi_9PMo_{12}O_{52})(SiO_2)_{65}$$

the Bi:Mo atomic ratio being 3:4.

4. A catalyst composition consisting essentially of oxides of bismuth and molybdenum as the essential catalytic ingredients and also including silica, the relative proportions of bismuth oxide, molybdenum oxide and silica, calculated as the elements, being as follows: bismuth 4.5 to 55%; molybdenum 2.5 to 32%; silicon 0.6 to 42%; the bismuth and molybdenum being in oxidation states ranging, respectively, from two to three and from four to six, and the atomic ratio of bismuth to molybdenum Bi:Mo being above 2:3.

5. A catalyst composition in accordance with claim 4 which also includes at least 0.1% by weight of phosphorus.

References Cited in the file of this patent

UNITED STATES PATENTS 2,881,212  Idol et al. _____ Apr. 7, 1959